(12) United States Patent
Lucas et al.

(10) Patent No.: US 9,593,960 B2
(45) Date of Patent: Mar. 14, 2017

(54) LOCATION BASED POINT OF INTEREST NAVIGATION SYSTEM

(71) Applicant: Panasonic Automotive Systems Company of America, Division of Panasonic Corporation of North America, Peachtree City, GA (US)

(72) Inventors: Peter Lucas, Pittsburgh, PA (US); Michael McManus, Oakdale, PA (US); Jeremy Koempel, Pittsburgh, PA (US)

(73) Assignee: Panasonic Automotive Systems Company of America, division of Panasonic Corporation of North America, Peachtree City, GA (US)

( * ) Notice: Subject to any disclaimer, the term of this patent is extended or adjusted under 35 U.S.C. 154(b) by 0 days.

(21) Appl. No.: 15/019,742

(22) Filed: Feb. 9, 2016

(65) Prior Publication Data

US 2016/0161279 A1    Jun. 9, 2016

Related U.S. Application Data

(63) Continuation of application No. 11/818,494, filed on Jun. 14, 2007, now Pat. No. 9,285,228.

(51) Int. Cl.
*G01C 21/00* (2006.01)
*G01C 21/36* (2006.01)
*G01C 21/26* (2006.01)
*G01S 19/42* (2010.01)

(52) U.S. Cl.
CPC ......... *G01C 21/3679* (2013.01); *G01C 21/26* (2013.01); *G01C 21/3611* (2013.01); *G01S 19/42* (2013.01)

(58) Field of Classification Search
None
See application file for complete search history.

(56) References Cited

U.S. PATENT DOCUMENTS

| | | | |
|---|---|---|---|
| 6,282,496 B1* | 8/2001 | Chowdhary | G01C 21/26 342/357.31 |
| 6,429,789 B1* | 8/2002 | Kiridena | B60R 1/00 340/905 |
| 7,546,202 B2* | 6/2009 | Oh | G01C 21/3644 340/995.19 |

(Continued)

*Primary Examiner* — Bhavesh V Amin
(74) *Attorney, Agent, or Firm* — Laurence S. Roach, Esq.

(57) ABSTRACT

A navigation system for an automotive vehicle that travels on roads includes a vehicle positioning apparatus that determines location data associated with the vehicle. A source of attraction location data provides location data associated with a plurality of attractions that are of interest to a user of the vehicle. A processing device is communicatively coupled to the vehicle positioning apparatus and to the source of attraction location data. The processing device calculates a distance and direction from the vehicle to at least one of the attractions of interest. The calculating is based upon the location data associated with the vehicle and the location data associated with the attractions of interest. A graphical display arrangement is communicatively coupled to the processing device. The graphical display arrangement indicates the calculated distance and direction without graphically indicating orientation of roads on which the vehicle may travel.

20 Claims, 7 Drawing Sheets

(56) References Cited

U.S. PATENT DOCUMENTS

| | | | | |
|---|---|---|---|---|
| 7,565,239 | B2* | 7/2009 | de Silva | G01C 21/3611 |
| | | | | 340/995.27 |
| 7,743,056 | B2* | 6/2010 | Meisels | G06F 17/30241 |
| | | | | 707/731 |
| 9,285,228 | B2* | 3/2016 | Lucas | G01C 21/26 |
| 2005/0273251 | A1* | 12/2005 | Nix | G01C 21/3461 |
| | | | | 701/533 |
| 2006/0229807 | A1* | 10/2006 | Sheha | G01C 21/3679 |
| | | | | 701/468 |
| 2008/0312822 | A1* | 12/2008 | Lucas | G01C 21/26 |
| | | | | 701/465 |
| 2011/0184644 | A1* | 7/2011 | McBurney | G01C 21/12 |
| | | | | 701/532 |
| 2011/0208424 | A1* | 8/2011 | Hirsch | G01C 21/165 |
| | | | | 701/532 |
| 2011/0257882 | A1* | 10/2011 | McBurney | G01C 21/30 |
| | | | | 701/532 |

\* cited by examiner

LOCATION BASED POINT OF INTEREST NAVIGATION SYSTEM

CROSS-REFERENCE TO RELATED APPLICATION

This application is a continuation of U.S. patent application Ser. No. 11/818,494, filed on Jun. 14, 2007, which is currently under allowance, the disclosure of which is hereby incorporated by reference in its entirety for all purposes.

BACKGROUND OF THE INVENTION

Field of the Invention

The present invention relates generally to electronic vehicle navigation systems.

Description of the Related Art

Navigation systems are provided in vehicles, such as automobiles, for providing assistance to occupants of the vehicles in finding their way to their destinations. The navigation system typically includes a global positioning system (GPS) that tracks the changing locations of the vehicle on the surface of the earth in real time. The navigation system also stores extensive map data that enables the navigation system to track the changing street locations of the vehicle based upon the GPS data. A video screen may display the mapping of streets in the vicinity of the vehicle, as well as the current location of the vehicle on the grid of interconnected roadways.

One difficulty associated with the above-described navigation systems is that the level of complexity of the display and interfaces is daunting for the casual user, and hence the navigation system may be especially difficult for a user to operate while driving. Also, the density of the visual information provided on the video screen, including a mapping of surrounding roads, may make comprehension difficult for a driver whose attention is primarily directed to the task of driving safely.

Another difficulty is that the world-wide map information requires a large amount of memory capacity to store, as well as considerable processing capability to display. These memory and processing requirements, together with the complexity of the user interfaces, result in a system that is too costly for many vehicle purchasers. The cost is further increased due to the road map data being proprietary information that the vehicle manufacturer must license from the owner of the information.

What is needed in the art is a vehicle navigation system that is less expensive and easier for a user to operate and comprehend.

SUMMARY OF THE INVENTION

The present invention is directed to an easy-to-use vehicle navigation system that provides the user with intuitive navigation information without reliance on road map data.

The invention comprises, in one embodiment thereof, a navigation system for an automotive vehicle that travels on roads. The navigation system includes a vehicle positioning apparatus that determines location data associated with the vehicle. A source of attraction location data provides location data associated with a plurality of attractions that are of interest to a user of the vehicle. A processing device is communicatively coupled to the vehicle positioning apparatus and to the source of attraction location data. The processing device calculates a distance and direction from the vehicle to at least one of the attractions of interest. The calculating is based upon the location data associated with the vehicle and the location data associated with the attractions of interest. A graphical display arrangement is communicatively coupled to the processing device. The graphical display arrangement indicates the calculated distance and direction without graphically indicating orientation of roads on which the vehicle may travel.

The invention comprises, in another embodiment thereof, a method of providing navigation information within an automotive vehicle that travels on roads. A location that is of interest to an occupant of the vehicle is identified, and a location of the vehicle is determined. The occupant is provided with an indication of distance and direction from the vehicle to the location of interest without providing the occupant with a graphical indication of orientation of roads on which the vehicle may travel.

The invention comprises, in yet another embodiment thereof, a method of providing navigation information within an automotive vehicle, including selecting a plurality of attractions that are of interest to an occupant of the vehicle. Location data associated with the attractions of interest is loaded into the vehicle. A category of the attractions of interest is chosen, and a location of the vehicle is determined. The occupant is provided with a graphical indication of distance and direction from the vehicle to a plurality of attractions within the chosen category of the attractions of interest. The graphical indication is devoid of road locations.

The invention comprises, in still another embodiment thereof, a method of providing navigation information within a vehicle, including selecting a plurality of attractions that are of interest to an occupant of the vehicle. Location data associated with the attractions of interest is loaded into the vehicle. A category of the attractions of interest is chosen, and a location of the vehicle is determined. Within the chosen category, a group of attractions of interest that are closest to the vehicle are identified. The occupant is provided with an indication of distance from the vehicle to each of the attractions of interest within the group of attractions of interest that are closest to the vehicle.

An advantage of the present invention is that there is no need for road mapping information.

Another advantage is that the navigation information is presented in a format that is easier to understand than the formats of conventional navigation systems.

Yet another advantage is that the navigation system is less expensive than conventional navigation systems.

A further advantage is that the navigation system is easier to operate than conventional navigation systems.

BRIEF DESCRIPTION OF THE DRAWINGS

The above-mentioned and other features and advantages of the invention will become more apparent to one with skill in the art upon examination of the following figures and detailed description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PRESENTLY PREFERRED EMBODIMENTS

Figure 1:
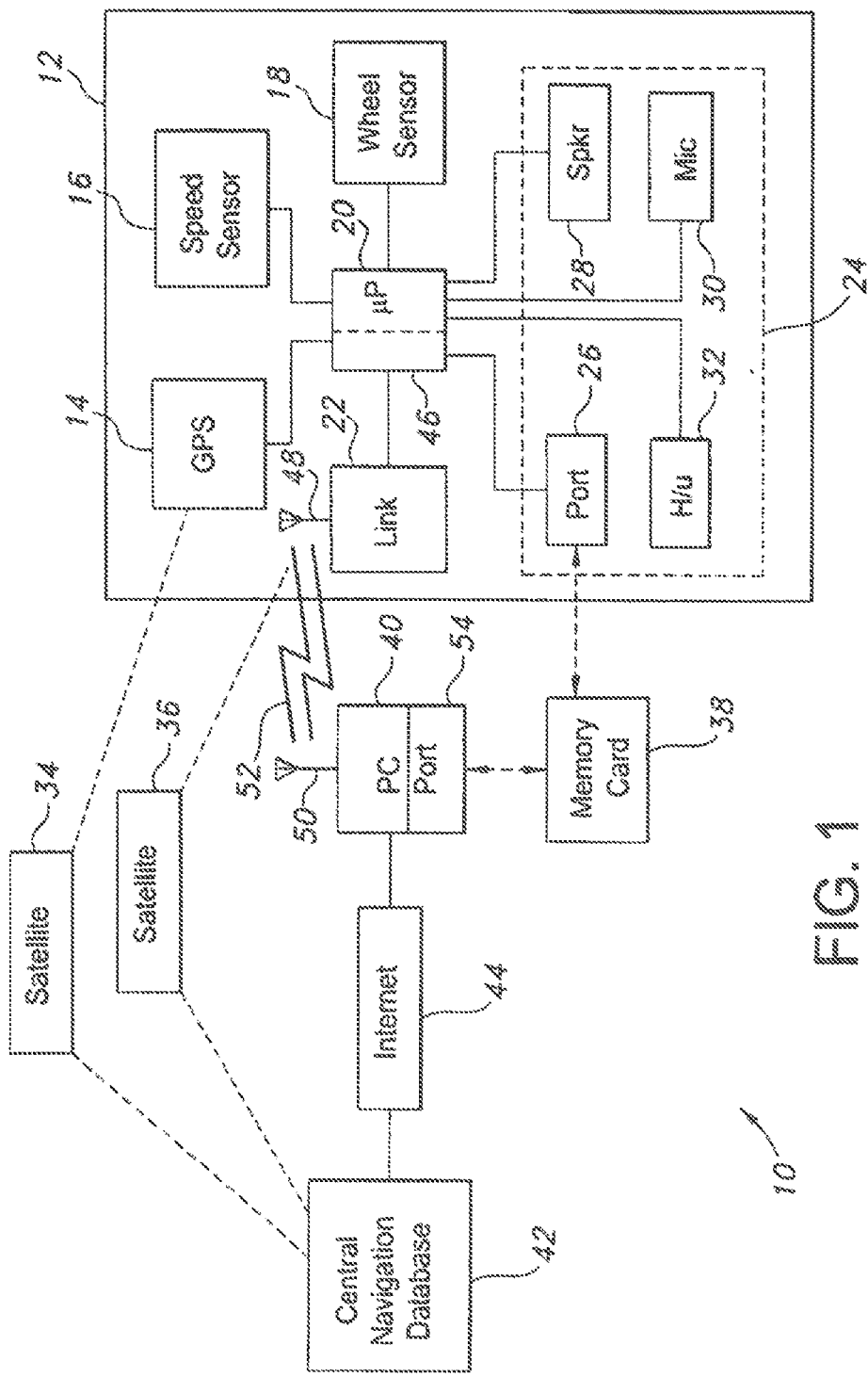
FIG. 1 is a block diagram of one embodiment of a navigation system of the present invention.

Referring to FIG. 1, there is shown one embodiment of a vehicle navigation system 10 of the present invention for a vehicle 12. In one embodiment, vehicle 12 is a type of vehicle that travels on roads, such as an automobile or truck, for example. Within vehicle 12 may be navigation system components such as global positioning system (GPS) module 14, speed sensor 16, wheel sensor 18, processor 20, communications link 22, and a user interface 24 including port 26, audio speaker 28, microphone 30, and head unit 32, in addition to the components within vehicle 12, navigation system 10 may include satellites 34, 36, memory card 38, and a personal computer (PC) 40 in communication with a central navigation database 42 through the Internet 44.

Satellite 34, GPS 14, speed sensor 16 and wheel sensor 18 may together form a vehicle positioning apparatus that determines location data associated with vehicle 12. GPS 14 and satellite 34 may cooperate to continually pinpoint the exact location of vehicle 12 on the surface of earth, expressed in latitude and longitude, as is well known conventionally. The change in the vehicle location over time, as determined by GPS 14 and satellite 34, provides some indication of the direction in which vehicle 12 is heading, i.e., the heading direction. However, GPS 14 and satellite 34 may not be sufficient to accurately ascertain the heading direction of vehicle 12 when vehicle 12 has recently made a turn. Thus, in order to more accurately determine the heading direction, wheel sensor 18 may provide the direction in which the wheels, e.g., front wheels, of vehicle 12 are turned, and speed sensor 16 may provide the speed of vehicle 12 while vehicle 12 is turning in the directions determined by the positions of the wheels. By analyzing the signals from speed sensor 16 in conjunction with the signals from wheel sensor 18, processor 20 may determine the change in heading direction as compared to the more generalized heading direction provided by satellite 34 and GPS 14. It is also possible, in another embodiment, for the heading direction of the vehicle to be at least partially determined by use of a compass on-board vehicle 12.

Processor 20 may include an electronic memory device 46 that stores location data, e.g., latitudes and longitudes, for each of a list of attractions that the occupants of vehicle 12 may potentially want to drive to, or at least be aware of. Attractions may include restaurants, hotels, historical landmarks, parks, parking lots, service stations, hospitals, stores, the homes of friends and family, etc. Identifying information for the attractions, which may include names, street addresses, web addresses, and telephone numbers, may also be stored in memory device 46 in association with the location data. The attraction location data may originate in central navigation database 42, and may be transferred to memory device 46 by any of various routes. In one embodiment, the attraction location data is transferred from database 42 to memory device 46 via satellite 36, antenna 48 and communications link 22. Head unit 32 may include dials, knobs and/or pushbuttons (not shown) that enable a user to pick and choose attractions, or categories of attractions, whose location data is to be stored in memory device 46.

In another embodiment, the attraction location data is transferred from database 42 to memory device 46 via interne 44, PC 40, antenna 50, antenna 48 and communications link 22. More particularly, a user may use PC 40 to download from database 42 location data associated with various attractions, or categories of attractions, in which the user may be interested. The user may also use PC 40 and/or Internet 44 to enter known street addresses of interest and convert the addresses into location data of interest that may be used in relation with the vehicle location data as determined by the vehicle positioning apparatus. PC 40 may be disposed inside a building (not shown) adjacent to which vehicle 12 is parked. The attraction location data may then be transmitted from antenna 50 to antenna 48 via airborne signals, as indicated at 52.

In yet another embodiment, the attraction location data is transferred from PC 40 to memory device 46 via PC port 54, memory card 38 and port 26. Memory card 38 may be in the form of a secure digital memory card, commonly known as an "SD memory card". In other embodiments, memory car 38 may be in the form of an SDIO (secure digital input/output) card, a USB flash drive, a compact flash card, or a memory stick, for example. Memory card 38 may be inserted into port 54 so that PC 40 may write the attraction location data onto memory card 38. Memory card 38 may then be inserted into port 26 such that the contents of card 38 may be read and copied into memory device 46.

As described above, memory device 46 may function as source of attraction location data, and may receive the attraction location data from either link 22 or port 26. Further, as attractions are built, move, or shut down, memory device 46 may receive updates of the attraction location data from a source external to vehicle 12. Such external sources may include satellite 36, PC 40 and/or memory card 38, for example.

Alternatively, attractions of interest to the user may be chosen automatically, perhaps in some objective fashion. For example, processor 20 may maintain in memory 46 a historical data record of the prior locations or attractions that vehicle 12 or a particular occupant has visited in the past. Processor 20 may then identify the attractions most frequently visited in the past as being attractions of interest.

It is also possible to determine attractions of interest based on not only the historical data of vehicle 12, but also on the aggregate historical data collected from a group of vehicles 12. For example, each vehicle 12 may transmit its historical location data to database 42 via PC 40 and Internet 44, via satellite 36, and/or via satellite 34. The attractions most frequently visited by vehicles 12 as a group may then be designated as attractions of interest to each individual vehicle 12, or to individual occupants of vehicle 12.

As described above, processor 20 is communicatively coupled to the vehicle positioning apparatus (including satellite 34, GPS 14, speed sensor 16 and wheel sensor 18) and to the source of attraction location data (including link 22 and port 26). Based upon the location data associated with vehicle 12 (as received from the vehicle positioning apparatus) and the location data associated with the attractions of interest (as received from the source of attraction location data), processor 20 may calculate a distance and direction from vehicle 12 to at least one of the attractions of interest.

Figure 2:
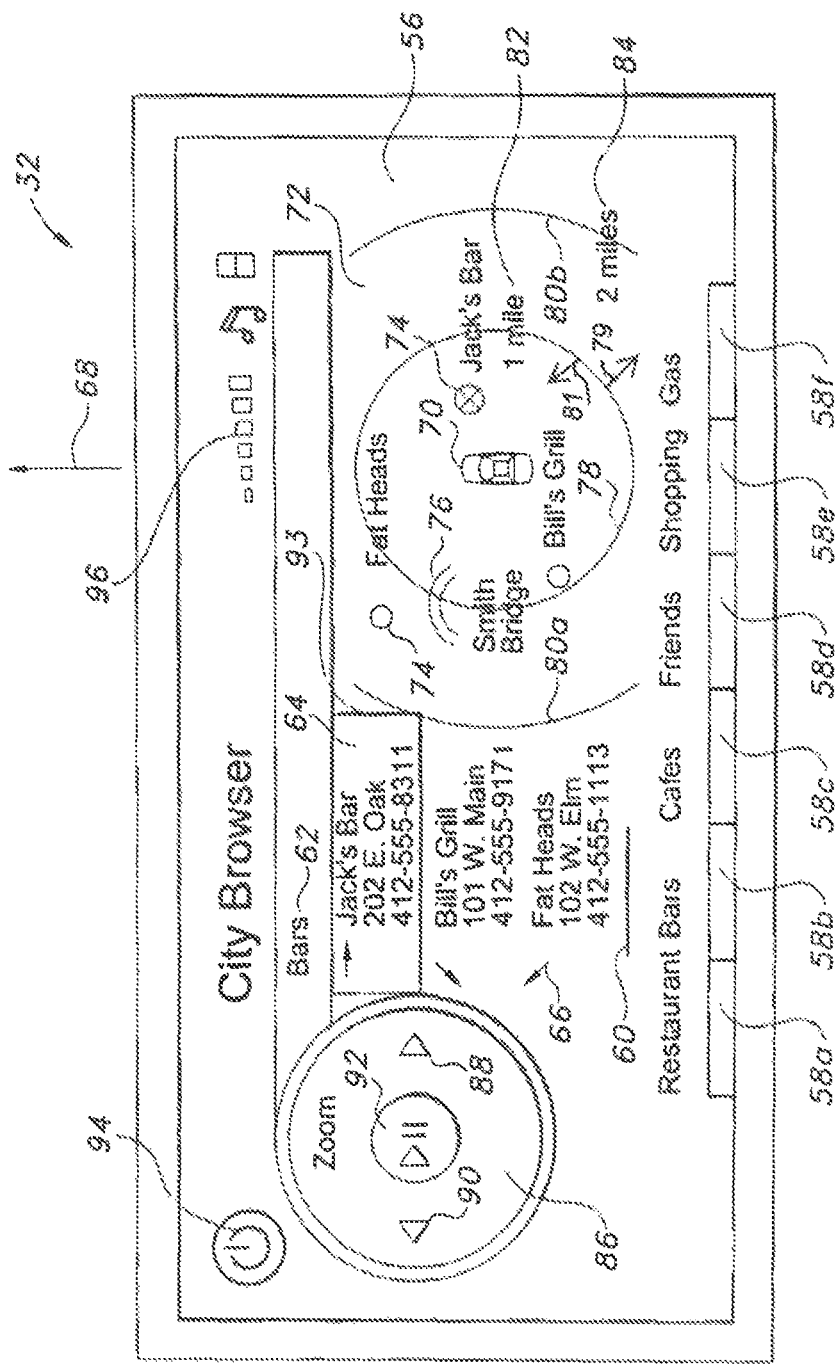
FIG. 2 is a plan view of one embodiment of the head unit of the navigation system of FIG. 1.

Head unit 32 is shown in more detail in FIG. 2. Head unit 32 includes a graphical display arrangement that may be communicatively coupled to processor 20, and that may spatially indicate to a viewer the locations of various attractions relative to vehicle 12. More particularly, head unit 32 may include a display screen 56 that graphically or spatially indicates a calculated distance and direction from vehicle 12 to at least one attraction of interest. Further, screen 56 may provide this indication without graphically indicating orientation of roads on which vehicle 12 may travel. Thus, there may be no need for storing or accessing road map information.

Head unit 32 may include pushbuttons 58a-f that enable a user to select a category of attractions of interest for display on screen 56. For example, in the embodiment shown, pushbuttons 58a-f enable a user to select the categories of "Restaurant", "Bars", "Cafes", "Friends", "Shopping", and "Gas", respectively. Display screen 56 is shown in FIG. 2 in a state wherein the category of "Bars" has been selected, as indicated by category marker 60 and by a text heading 62.

Display screen 56 may include a text section 64 including textual identification information for attractions within the selected category, i.e., "Bars", that are closest to vehicle 12. As shown, the identification information may include the name of the attraction, its street address, and its telephone number. It is also possible for the identification information to include a web address, i.e., domain name. The identification information may be listed in order of increasing distance of the attraction from vehicle 12, as is the case in FIG. 2.

Directional arrows 66 may be provided adjacent to each set of identification information in order to indicate the direction of each attraction from vehicle 12, with a heading direction 68 of vehicle 12 being designated as the vertically upward direction by convention. A vehicle icon 70 in a graphical section 72 of screen 56 may be oriented such that it is facing in heading direction 68.

In another embodiment, the vertically upward direction on display 56 may be permanently designated as the cardinal direction of north. In this embodiment, the orientation of vehicle icon 70 on display 56 varies according to the heading direction of vehicle 12. For example, if the heading direction is south, then vehicle icon 70 is oriented such that it faces the vertically downward direction on screen 56.

Attraction icons 74, which in FIG. 2 are provided in the form of circles, may be provided in graphical section 72 to indicate the distance and direction (relative to heading direction 68) from vehicle 12 from each of the attractions. A text identifier may be provided adjacent to each icon 74. One or more landmark icons 76 may be provided in graphical section 72 to give the user points of reference.

Circles 78, or circle portions, i.e., arcs 80a, 80b, may be positioned concentrically with vehicle icon 70 to thereby give the viewer a reference as to how far away vehicle 12 is from each attraction represented by an icon 74. For example, a textual indication 82 is provided on screen 56 to indicate that all points on circle 78 are approximately one mile from vehicle 12. Similarly, a textual indication 84 is provided to indicate that all points on arcs 80a, 80b are about two miles from vehicle 12.

A zoom toggle switch 86 may be provided to enable the view to cause graphical section 72 to zoom in or out, i.e., change the scale of section 72. For example, pressing a "zoom-in" portion 88 of switch 86 may cause circle 78 and arcs 80 to get larger, and may cause attraction icons 74 and landmark icons 76 to move away from vehicle icon 70 correspondingly. Conversely, pressing a "zoom-out" portion 90 of switch 86 may cause circle 78 and arcs 80 to get smaller, and may cause attraction icons 74 and landmark icons 76 to move toward vehicle icon 70 correspondingly.

The scale of section 72 may also be dependent upon the speed of vehicle 12. More particularly, processor 20 may receive speed signals from speed sensor 16 and may change the scale of section 72 accordingly. For example, at slower speeds, section 72 may effectively "zoom-in", e.g., circle 78 becomes larger, as indicated at 79, and at higher speeds section 72 may effectively "zoom-out", e.g., circle 78 becomes smaller, as indicated at 81. This feature may be desirable because higher speeds may be indicative that the driver is not likely to stop at nearby attractions, and lower speeds may be indicative that the driver is more likely to stop at nearby attractions, i.e., the driver may be in heavy traffic around the attraction, may be looking for the attraction, or may be looking for a parking spot.

An advance pushbutton 92 may be provided to enable the user to select a particular attraction for highlighting. In the state shown in FIG. 2, "Jack's Bar" is the attraction that has been selected for highlighting. In the embodiment shown, highlighting results in an outline 93 being provided around the text section 64 and around the directional arrow 66 associated with the selected attraction. Highlighting also results in the icon 74 for the selected attraction being given a special marking to make it easy to identify for the viewer. for example, in the embodiment shown, the icon 74 for the selected attraction "Jack's Bar" has been marked with an "x" inside the circle. It is also possible for the icon 74 for the selected attraction to be provided with a distinctive background color, such as red, such that the viewer can easily perceive the location of the selected attraction on screen display 56. Moreover, vehicle icon 70 may also be provided with a distinctive and contrasting color, such as green, such that the viewer may easily perceive the location of vehicle 12 on screen display 56, as well as the relative locations of vehicle 12 and the selected attraction.

In addition to, or instead of the visual indications of distance and direction, the navigation system may provide audial indications of distance and direction between the vehicle and the attractions of interest. For example, the navigation system may audibly state "Jack's Bar is one-half mile to the right". Additionally, or alternatively, the navigation system may state the direction in terms of the cardinal directions, such as by stating "Jack's Bar is one-half mile to the southwest."

The audial indications may be played or broadcast on speaker 28, such as by a computer generated voice. Head unit 32 may include an ON/OFF pushbutton 94 that also includes a volume dial by which the user may control the volume of the audial indications. Display screen 56 may include a visual volume indicator 96 that provides the viewer with a visual indication of the volume level as controlled by the volume dial, It is also possible, in a voice-activated system, for the user to select attractions, or categories of attractions, by using spoken words instead of pushbuttons 58, 92. The spoken words, or commands, may be received by microphone 30 and interpreted by processor 20. For example, the user may speak the name of a category, such as "Bars", to thereby select that category. The user may then select an attraction within the category by speaking the name of the attraction, such as "Jack's Bar". The navigation system may also recognize certain spoken commands for navigating though the hierarchy of attraction categories and individual attractions within the categories. For example, the user may say "next" in order to select the next attraction on the list. Or, the user may say "next category".

Figure 3:
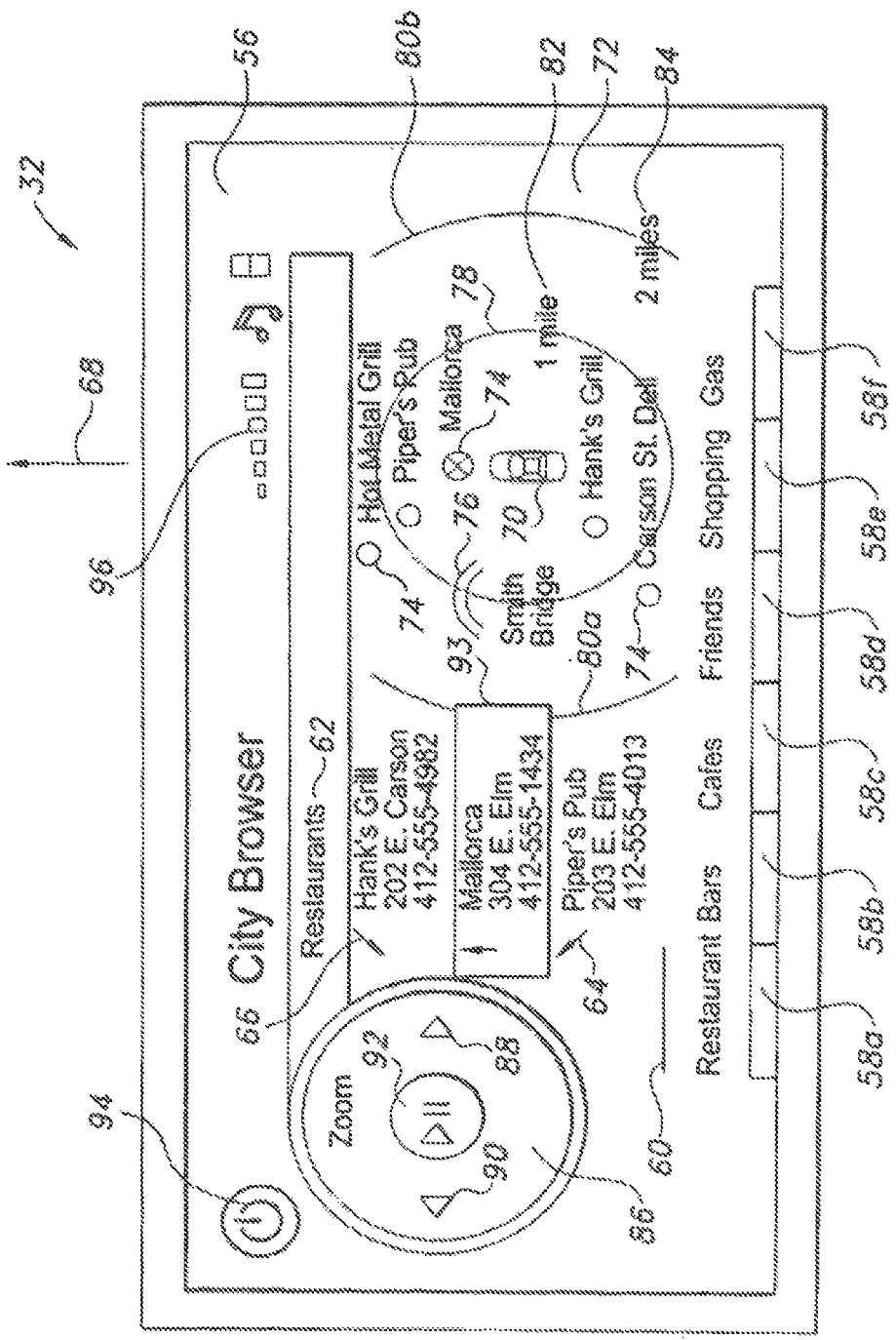
FIG. 3 is another plan view of the head unit of FIG. 2.

FIG. 3 illustrates head unit 32 in its state after the user has selected the category of "Restaurant", and has selected the restaurant named "Mallorca." As illustrated, the display of landmark icon 76 is unaffected by the category of attractions that is selected.

Figure 4:
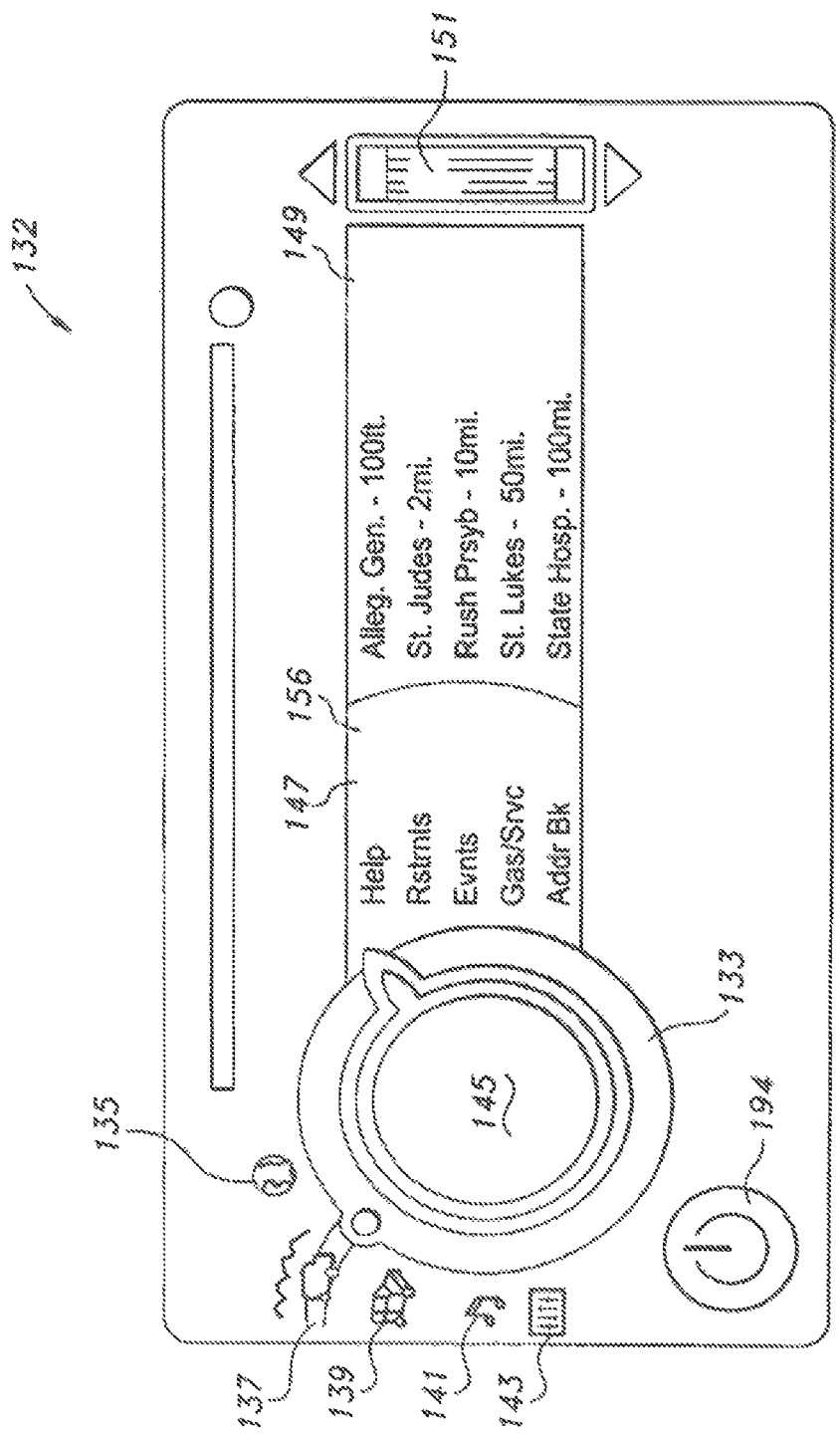
FIG. 4 is a plan view of another embodiment of a head unit of the navigation system of FIG. 1.

Another embodiment of a head unit 132 suitable for use in a navigation system of the present invention is illustrated in FIG. 4. Head unit 132 may provide only textual or audial indications of the distance, and possibly the direction, between the vehicle and various attractions of interest. Head unit 132 may include an ON/OFF pushbutton 194 that also includes a volume dial by which the user may control the volume of the audial indications.

A first dial 133 may be used by an occupant to select the scope of the information and indications that are displayed on a display screen 156. In this embodiment, dial 133 has five positions, including world-wide 135, around town 137, within the vehicle 139, audio selections 141, and tuning details 143, in the state shown in FIG. 4, dial 133 is in the around town position 137.

A second dial 145 may be used by an occupant to select a category of attractions from five categories listed in a category section 147 of display screen 156. The categories illustrated for the around town position 137 include "Help" (attractions around town that provide help), "Rstrnts" (restaurants around town), "Evnts" (events around town), "Gas/Srvc" (gas/service stations around town), and "Addr Bk" (address book of friends and family around town). In the state shown in FIG. 4, dial 145 is in position to select the "Help" category.

With the "Help" category selected, an attractions section 149 of display screen 156 may list attractions divided into sub-categories such as hospitals, dentists, attorneys, optometrists, etc. In the state shown in FIG. 4, attractions in the sub-category of hospitals are shown in attractions section 149. Next to each hospital name, a textual indication of distance between the vehicle and the hospital is provided. The hospitals may be sorted in order of increasing distance between the vehicle and the hospital.

A dial 151 may enable the user to scroll up and down along the listing of attractions. From the state shown in FIG. 4, dialing down may cause other hospitals to be listed in attractions section 149. Dialing down further may cause other sub-categories of attractions, such as dentists, attorneys, optometrists, etc., to be listed in attractions section 149. Clicking on dial 151 may result in more information about a selected attraction (e.g., an attraction listed at the top of attractions section 149) to be displayed, or may result in switching from displaying one sub-category of attractions to displaying another sub-category of attractions.

When dial 133 is in the world-wide position 135, categories displayed in section 147 may include airports, cities, natural attractions, such as state or national parks, post offices that are currently open, etc. When dial 133 is in the vehicle position 139, categories displayed in section 147 may include HVAC features, settings for power seats and mirrors, suspension system settings, etc. When in the audio selections position 141, categories displayed in section 147 may include AM radio, FM radio, compact disc, and other media. When in the tuning details position 143, categories displayed in section 147 may include equalizer settings for various types of audio, such as jazz, classical, etc.

As is evident from the above description, when dial 133 is in the vehicle 139, audio selections 141, and or tuning details 143 positions, the choices listed in section 149 are not attractions that are disposed outside of the vehicle, but rather are settings within the vehicle. Thus, head unit 132 may serve not just the navigation system, but may also serve the audio system, HVAC system, and other systems within the vehicle. More generally, the controls and displays of the navigation system of the present invention may be shared with other devices in the vehicle, such as the radio or instrument panel.

Figure 5:
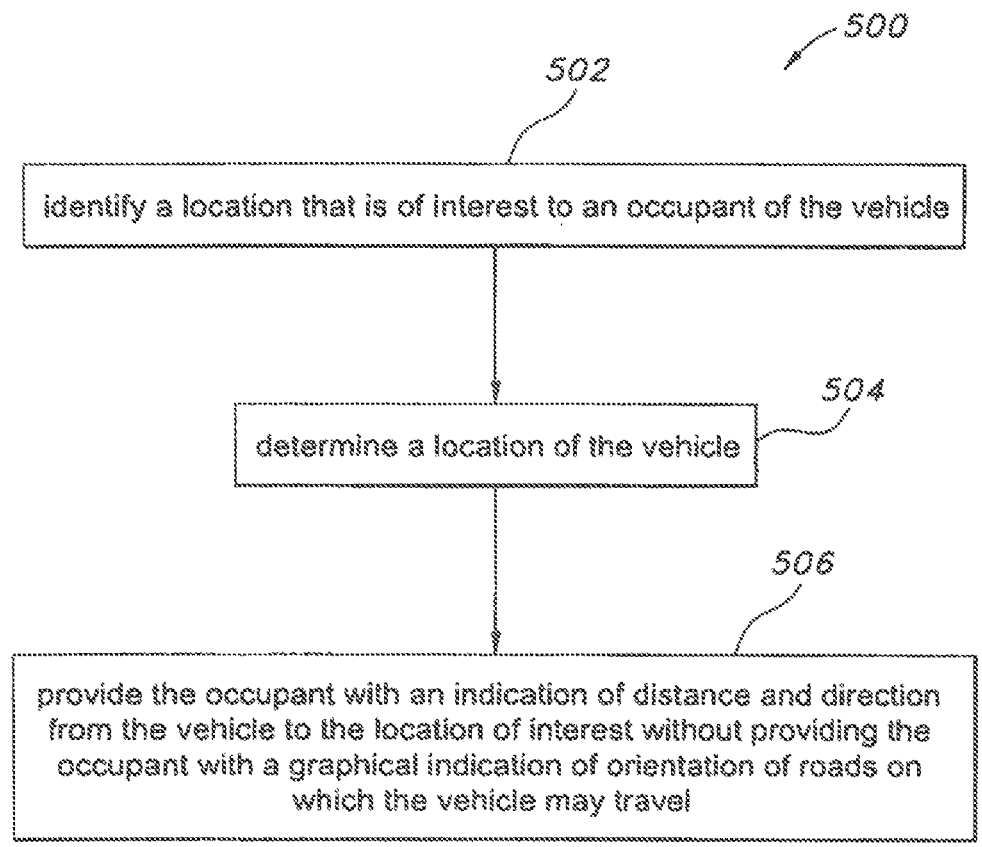
FIG. 5 is a flow chart of one embodiment of a method of the present invention for providing navigation information.

FIG. 5 illustrates one embodiment of a method 500 of the present invention for providing navigation information. In a first step 502, a location that is of interest to an occupant of the vehicle is identified. In the embodiment illustrated in FIG. 2, for example, the three locations respectively associated with the attractions "Jack's Bar", "Bill's Grill", and "Fat Heads" are identified as being of interest to an occupant of vehicle 12, possibly partially due to the category of "Bars" being selected, such as by the occupant pressing pushbutton 58b. In a next step 504, a location of the vehicle is determined. More particularly, GPS 14 may continuously provide updates of the location of vehicle 12 to processor 20. The locations of both the vehicle and the locations of interest may be expressed in terms of longitude and latitude or some equivalent coordinate system. In a final step 506, the occupant is provided with an indication of distance and direction from the vehicle to the location of interest without providing the occupant with a graphical indication of orientation of roads on which the vehicle may travel. For instance, in the embodiment illustrated in FIG. 2, the occupant is provided, within graphical section 72, with spatial indications of distance from vehicle 12 to each of the locations associated with the attractions "Jack's Bar", "Bill's Grill", and "Fat Heads". Moreover, the direction from vehicle 12 to each of the three locations of interest is indicated relative to heading direction 68 by the particular placements of icons 74 within graphical section 72. For example, "Jack's Bar" is placed at the three o'clock position, which is displaced 90 degrees clockwise from heading direction 68. Further, the above-described indications are provided without providing the occupant with a graphical indication of orientation of roads on which the vehicle may travel. Although each attraction icon 74 may represent a point on the road that is identified in the street address of text section 64, no graphical indication of the directions in which that road is aligned or is oriented is provided. Thus, no road map data is required by the present invention.

Figure 6:
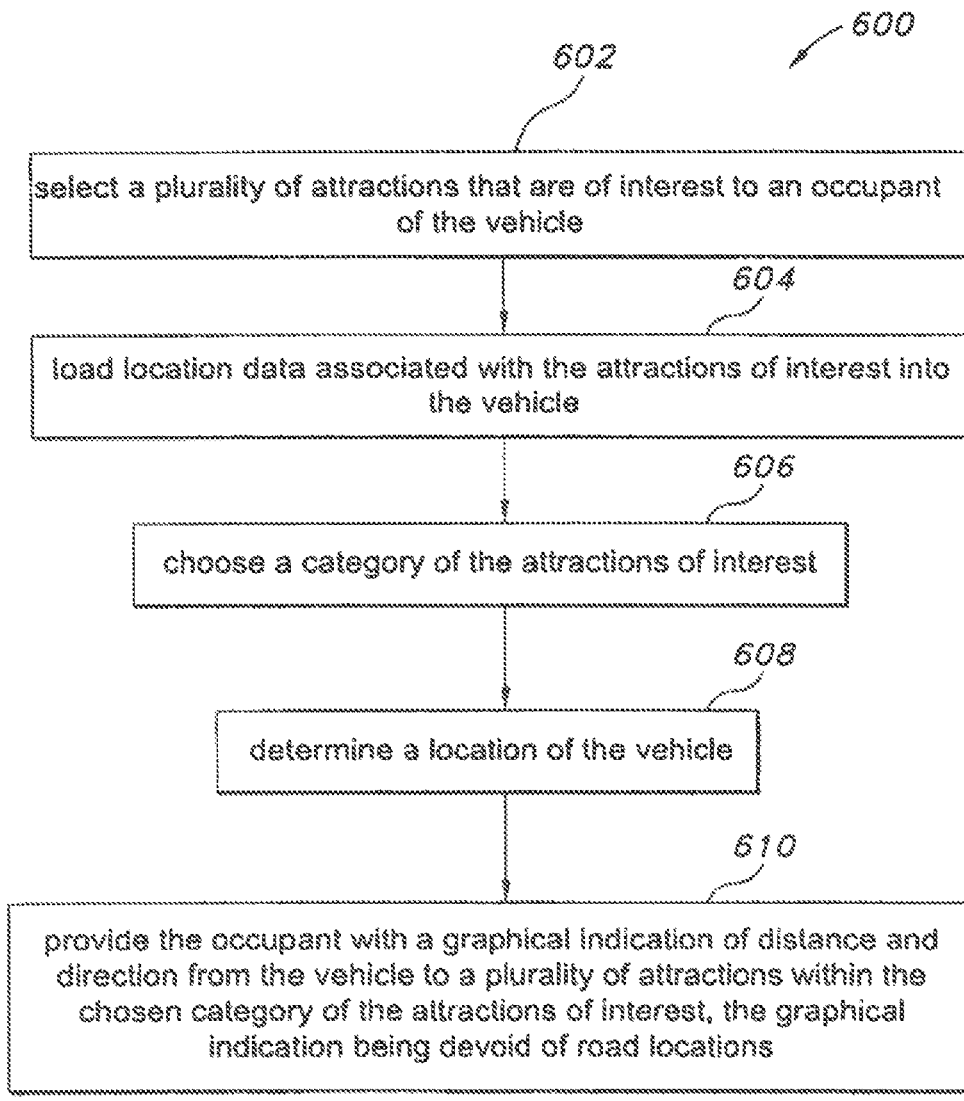
FIG. 6 is a flow chart of another embodiment of a method of the present invention for providing navigation information.

FIG. 6 illustrates another embodiment of a method 600 of the present invention for providing navigation information. In a first step 602, a plurality of attractions that are of interest to an occupant of the vehicle are selected. For example, database 42 may collect data from a population of vehicles 12, wherein the data includes a compilation of attractions visited by vehicles 12, and the locations associated with the attractions are ascertained by the respective GPS modules 14 on each vehicle. The locations most frequently visited by the population of vehicles 12 may be deemed or selected to be of interest to an occupant of an individual one of vehicles 12. Next, in step 604, location data associated with the attractions of interest are loaded into the vehicle. More particularly, the location data stored in database 42 may be loaded into memory 46 via any of various paths described above. Specifically, the location data may be transferred from database 42 to memory 46 through satellite 36 and link 22, through internet 44, PC 40 and link 22, or through internet 44, PC 40, port 54, memory card 38 and port 26. In a next step 606, a category of the attractions of interest is chosen. For example, an occupant of vehicle 12 may press one of pushbuttons 58, or turn dials 133, 145 in the embodiment of FIG. 4, to thereby choose a category of attractions. Alternatively, the occupant may speak a category name that is received by microphone 30 and interpreted by processor 20 to thereby choose a category of attractions. The occupant may choose the category of the attractions while the occupant is disposed in the vehicle. Next, in step 608, a location of the vehicle is determined, More particularly, GPS 14 may continuously provide updates of the location of vehicle 12 to processor 20. The location of the vehicle may be expressed in terms of longitude and latitude or some equivalent coordinate system. In a final step 610, the occupant is provided with a graphical indication of distance and direction from the vehicle to a plurality of attractions within the chosen category of the attractions of interest, the graphical indication being devoid of road locations. For instance, in the embodiment, illustrated in FIG. 2, the occupant is provided, within graphical section 72, with spatial indications of distance from vehicle 12 to each of the attractions that are closest to vehicle 12, i.e., "Jack's Bar", "Bill's Grill", and "Fat Heads", within the chosen category of "Restaurant". Moreover, the direction from vehicle 12 to each of the three attractions is indicated relative to heading direction 68 by the particular placements of icons 74 within graphical section 72. For example, "Jack's Bar" is placed at the three o'clock position, which is displaced 90 degrees clockwise from heading direction 68. Further, the above-described graphical indications are devoid of road locations on which the vehicle may travel. Although each attraction icon 74 may represent a point on the road that is identified in the street address of text section 64, the graphical indications within graphical section 72 are devoid of road locations. However, it is to be understood that it is within the scope of this embodiment of the invention for a road name to be provided in text within graphical section 72.

Figure 7:
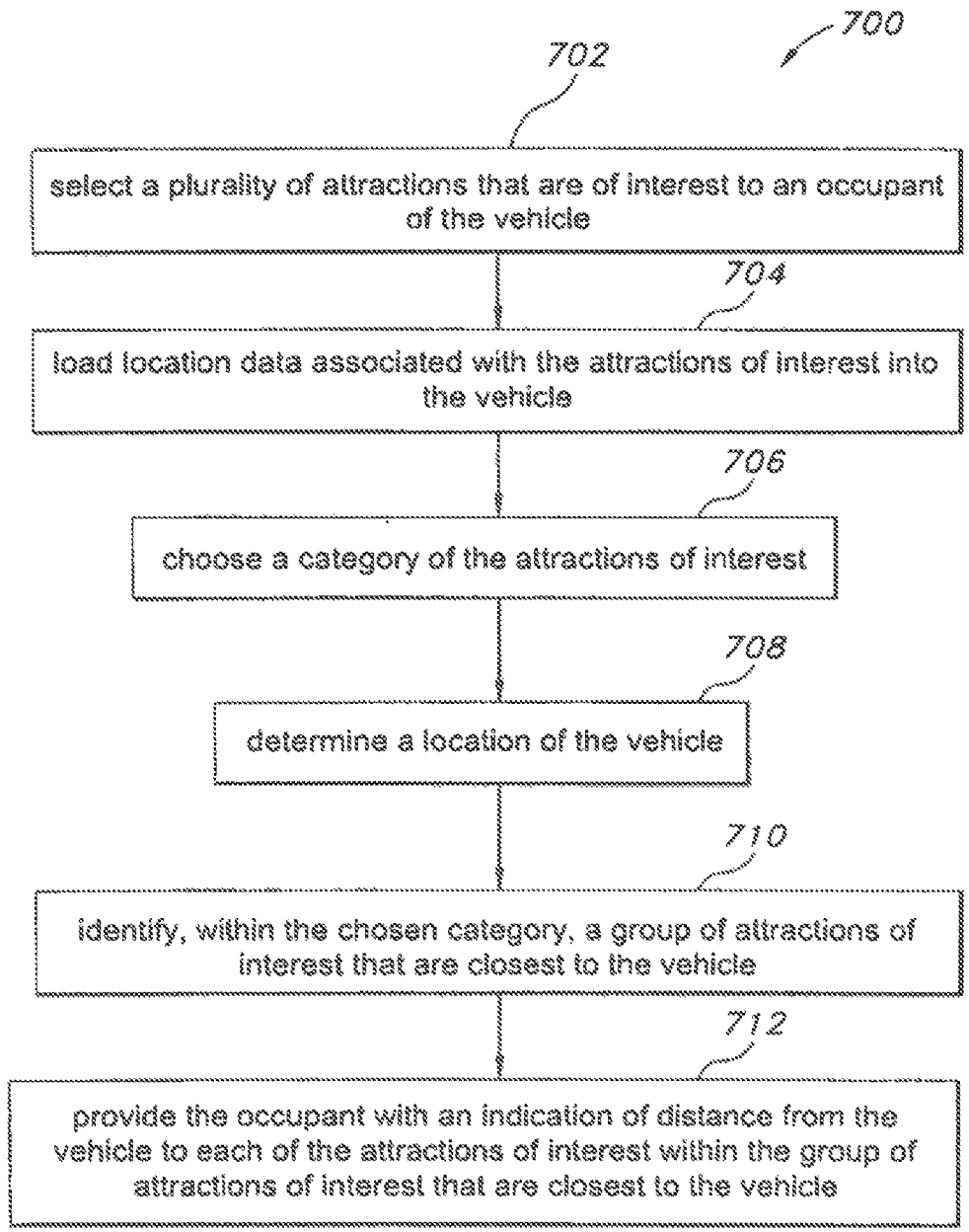
FIG. 7 is a flow chart of yet another embodiment of a method of the present invention for providing navigation information.

FIG. 7 illustrates yet another embodiment of a method 700 of the present invention for providing navigation information. Steps 702, 704, 706 and 708 may be substantially identical to respective steps 602, 604, 606 and 608 of method 600, and thus are not further described herein in order to avoid needless repetition. In a next step 710, within the category chosen in step 706, a group of attractions of interest that are closest to the vehicle are identified. For example, in the embodiment of FIG. 4, the hospitals within the "Help" category that are closest to vehicle 12, i.e., "Alleg. Gen.", "St. Judes", etc., are identified. In a final step 712, the occupant is provided with an indication of distance from the vehicle to each of the attractions of interest within the group of attractions of interest that are closest to the vehicle. For instance, in the embodiment illustrated in FIG. 4, the occupant is provided, within display screen 156, with numeric indications of distance from vehicle 12 to each of the closest hospitals.

The process of identifying locations or attractions of interest may include a user picking locations/attractions of interest from a list and programming them into the system. Such a list could later be revised or edited by the user as his needs or tastes change. The editing could be performed via a program on a PC, and possibly by use of removable media such as a memory card.

The process of identifying locations or attractions of interest may also include collecting empirical data regarding locations/attractions most visited. However, the identifying process could also involve a second party simply taking an educated guess as to what locations/attractions a vehicle occupant may typically be interested in. This second party may also maintain the central navigation database accordingly.

In another embodiment, the process of identifying locations or attractions of interest includes collecting evaluations of the locations/attractions submitted by occupants of the population of vehicles. These evaluations, which may include ratings and reviews, may be transmitted from each vehicle to the central navigation database via any of the mechanisms described above. Specifically, evaluation data may be entered by the user via a numeric keypad (not shown) and may be collected in memory device 46. The evaluation data may then be uploaded to database 42 via link 22, PC 40 and internet 44, via link 22 and satellite 36, or via port 26, memory card 38, port 54, PC 40 and interne 44, for example. Identification of locations that may be of interest to an occupant may be based upon a compilation of these evaluations.

Information about attractions of interest has been described above as including the distance and direction from the vehicle to the attractions. In another embodiment, the information includes additional content or additional levels of detail about the attractions, such as voice annotations, comments, addresses, contact information, images, or advertising, for example. A first group of additional content may include hours of operation, admission fees, price ranges, waiting times, etc. This first group of additional content may be of interest to a user in deciding whether to go to the attraction. A second group of such additional content may include parking directions, entrance locations, etc. This second group of additional content may be of interest to a user who has already decided to go to the attraction. Different groups of content may be provided depending upon a speed of the vehicle, an estimated time of arrival of the vehicle at the location of interest (or estimated time that will elapse before the vehicle arrives), and/or a distance from the vehicle to the location of interest.

Different levels of detail of the additional information may be provided dependent upon the speed of the vehicle, the estimated time of arrival of the vehicle at the location of interest, and/or a distance from the vehicle to the location of interest. For example, overall hours of operation of an amusement park may be provided when the vehicle is relatively far away, and specific hours of operation of individual portions of the park may be provided when the vehicle gets closer to the park.

The graphical and textual indications have been described herein as being provided on a head unit. However, in another embodiment they are provided on a windshield via a heads-up display.

While the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of providing navigation information within an automotive vehicle that travels on roads, said method comprising the steps of:
   identifying a location that is of interest to an occupant of the vehicle;
   processing signals from a vehicle wheel sensor to thereby determine a location of the vehicle, the signals indicating a direction in which at least one wheel of the vehicle is turned;
   providing the occupant with an indication of distance and direction from the location of the vehicle to the location of interest, the indication of distance and direction comprising a two-dimensional spatial graphical indication;

positioning circles and/or circle portions concentrically with a vehicle icon on the graphical indication, the vehicle icon and the circles and/or circle portions providing a viewer reference as to how far away the vehicle is from the location of interest icon;

ascertaining a speed of the vehicle; and adjusting a size of the circles and/or circle portions dependent upon the ascertained speed of the vehicle.

2. The method of claim 1, wherein said identifying step includes the occupant selecting at least one attraction from a list of attractions, the selected attraction being associated with the location of interest.

3. The method of claim 1, wherein said identifying step includes the occupant selecting a category of attractions, each of the attractions being associated with a respective location.

4. The method of claim 1, wherein said determining of the location of the vehicle includes using a global positioning system on-board the vehicle.

5. The method of claim 1, comprising the further step of determining a heading direction of the vehicle, the indication of direction from the vehicle to the location of interest being provided relative to the heading direction.

6. The method of claim 1, comprising the further step of collecting and storing historical data regarding prior locations of the vehicle, said identifying step being dependent upon the historical data.

7. The method of claim 6, wherein said identifying step is dependent upon historical data collected from other vehicles.

8. The method of claim 1, wherein said identifying step is dependent upon evaluations of the locations submitted by occupants of other vehicles.

9. The method of claim 1, wherein said providing step is performed without providing the occupant with an indication of orientation of roads on which the vehicle may travel.

10. A method of providing navigation information within an automotive vehicle that travels on roads, said method comprising the steps of:

identifying a location that is of interest to an occupant of the vehicle;

determining a location of the vehicle;

providing the occupant with an indication of distance and/or direction from the vehicle to the location of interest, said providing step being performed without providing the occupant with a graphical indication of orientation of roads on which the vehicle may travel; and providing the occupant with additional information about the location of interest, at least one of a level of detail of the additional in formation and a content of the additional information being dependent upon at least one of:

a speed of the vehicle;

an estimated time of arrival of the vehicle at the location of interest; and the distance from the vehicle to the location of interest.

11. The method of claim 10, wherein said identifying step includes the occupant selecting at least one attraction from a list of attractions, the selected attraction being associated with the location of interest.

12. The method of claim 10, wherein said identifying step includes the occupant selecting a category of attractions, each of the attractions being associated with a respective location.

13. The method of claim 10, wherein said determining step includes using a global positioning system on-board the vehicle.

14. The method of claim 10, comprising the further step of determining a heading direction of the vehicle, the indication of direction from the vehicle to the location of interest being provided relative to the heading direction.

15. The method of claim 10, comprising the further step of collecting and storing historical data regarding prior locations of the vehicle, said identifying step being dependent upon the historical data.

16. The method of claim 15, wherein said identifying step is dependent upon. historical data collected from other vehicles.

17. The method of claim 10, wherein said identifying step is dependent upon evaluations of the locations submitted by occupants of other vehicles.

18. A method of providing navigation information within an automotive vehicle that travels on roads, said method comprising the steps of:

identifying a location that is of interest to an occupant of the vehicle;

determining a location of the vehicle;

providing the occupant with an indication of distance and direction from the vehicle to the location of interest; and providing the occupant with additional information about the location of interest, at least one of a level of detail of the additional information and a content of the additional information being dependent upon at least one of:

a speed of the vehicle;

an estimated time of arrival of the vehicle at the location of interest; and the distance from the vehicle to the location of interest.

19. The method of claim 18, comprising the further step of determining a heading direction of the vehicle, the indication of direction from the vehicle to the location of interest being provided relative to the heading direction.

20. The method of claim 18, wherein said identifying step is dependent upon evaluations of the locations submitted by occupants of other vehicles.

* * * * *